(12) United States Patent
Cherukuri et al.

(10) Patent No.: US 8,516,023 B1
(45) Date of Patent: Aug. 20, 2013

(54) CONTEXT BASED FILE SYSTEM

(75) Inventors: Balaji Cherukuri, Bangalore (IN); Balaji Ramani, Bangalore (IN); Rajesh Rajaraman, Waltham, MA (US)

(73) Assignee: NetApp, Inc., Sunnyvale, CA (US)

( * ) Notice: Subject to any disclaimer, the term of this patent is extended or adjusted under 35 U.S.C. 154(b) by 160 days.

(21) Appl. No.: 12/793,633

(22) Filed: Jun. 3, 2010

(51) Int. Cl.
G06F 17/30 (2006.01)

(52) U.S. Cl.
USPC .......................................... 707/831

(58) Field of Classification Search
USPC .................. 707/822, 825, 827, 828, 829, 831
See application file for complete search history.

(56) References Cited

U.S. PATENT DOCUMENTS

| | | | | |
|---|---|---|---|---|
| 5,734,865 A * | 3/1998 | Yu | | 709/250 |
| 7,031,438 B1 * | 4/2006 | Cheston et al. | | 379/88.14 |
| 7,467,191 B1 * | 12/2008 | Wang et al. | | 709/221 |
| 7,756,821 B2 * | 7/2010 | Havens et al. | | 707/600 |
| 7,793,307 B2 * | 9/2010 | Gokhale et al. | | 719/324 |
| 7,822,974 B2 * | 10/2010 | Kinser et al. | | 713/156 |
| 7,966,294 B1 * | 6/2011 | Gupta et al. | | 707/654 |
| 7,979,517 B1 * | 7/2011 | Wang et al. | | 709/221 |
| 8,135,748 B2 * | 3/2012 | Rosikiewicz et al. | | 707/791 |
| 2004/0078371 A1 * | 4/2004 | Worrall et al. | | 707/9 |
| 2004/0133607 A1 * | 7/2004 | Miloushev et al. | | 707/200 |
| 2008/0250222 A1 * | 10/2008 | Gokhale et al. | | 711/203 |
| 2010/0070546 A1 * | 3/2010 | Meyer et al. | | 707/831 |
| 2010/0250825 A1 * | 9/2010 | Chen et al. | | 711/6 |
| 2010/0262797 A1 * | 10/2010 | Rosikiewicz et al. | | 711/162 |

* cited by examiner

*Primary Examiner* — Cam-Linh Nguyen
(74) *Attorney, Agent, or Firm* — Blakely, Sokoloff, Taylor & Zafman LLP

(57) ABSTRACT

A context-based file system (CBFS) receives a request to perform an operation in a hierarchy of directories from a virtual host running on a node in a storage server, the hierarchy having a parent-child relationship and a root directory. An identifier is obtained for the virtual host from an operating system. A directory associated with the virtual host is selected from the hierarchy based on a type of the operation and a position of the directory in the hierarchy. A result is received as a result of performing the operation on the selected directory.

32 Claims, 12 Drawing Sheets

CONTEXT BASED FILE SYSTEM

FIELD OF THE INVENTION

The present invention pertains generally to storage systems, and more particularly, to a method and apparatus for a context-based file system in a cluster.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2009, NetApp, Inc., All Rights Reserved.

BACKGROUND

A storage system is a computer that provides access to information that is stored on one or more storage devices connected to the storage system, such as disk drives ("disks"), flash memories, or storage arrays. The storage system includes an operating system that may implement a storage abstraction layer to logically organize the information as storage objects on the storage devices. With certain logical organizations, the storage abstraction layer may involve a file system which organizes information as a hierarchical structure of directories and files. Each file may be implemented as set of data structures, e.g., disk blocks, configured to store information, such as the actual data for the file. The file system typically organizes such data blocks as a logical "volume", where each volume may be associated with its own file system and may further be organized into logical sub-volumes referred to as qtrees. Each directory, file, qtree, and volume may constitute a storage object. In other logical organizations, a file system may constitute a storage object with the storage abstraction layer managing multiple file systems.

The storage system may be configured to operate according to a client/server model of information delivery to allow one or more clients access to data stored on the storage system. In this model, the client may comprise an application executing on a computer that "connects" to the storage system over a computer network, such as a point-to-point link, shared local area network, wide area network or virtual private network implemented over a public network, such as the Internet. A client may access the storage devices by submitting access requests to the storage system, for example, a "write" request to store client data included in a request to storage devices or a "read" request to retrieve client data stored in the storage devices.

A storage system may have the capability to provide virtual hosts to one or more clients. A virtual host provides a way of dividing the storage in a storage system. Each virtual host runs its own operating system and can run its own processes. Each virtual host has assigned storage for storing data. In most virtual hosts, there is a need to share common executables and libraries.

SUMMARY

A context-based file system (CBFS) receives a request to perform an operation in a hierarchy of directories from a virtual host running on a node in a storage server, the hierarchy having a parent-child relationship and a root directory. An identifier is obtained for the virtual host from an operating system. A directory associated with the virtual host is selected from the hierarchy based on a type of the operation and a position of the directory in the hierarchy. A result is received as a result of performing the operation on the selected directory.

The present invention is described in conjunction with systems, clients, servers, applications, methods, and computer-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A method and system for a context-based file system (CBFS) is provided herein. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

Using aspects of the novel techniques described herein, the CBFS allows multiple virtual hosts to share data which is not private to a specific virtual host, such as executables and libraries. Furthermore, data which is private to a virtual host cannot be accessed by other virtual hosts running on the storage system.

Figure 1:
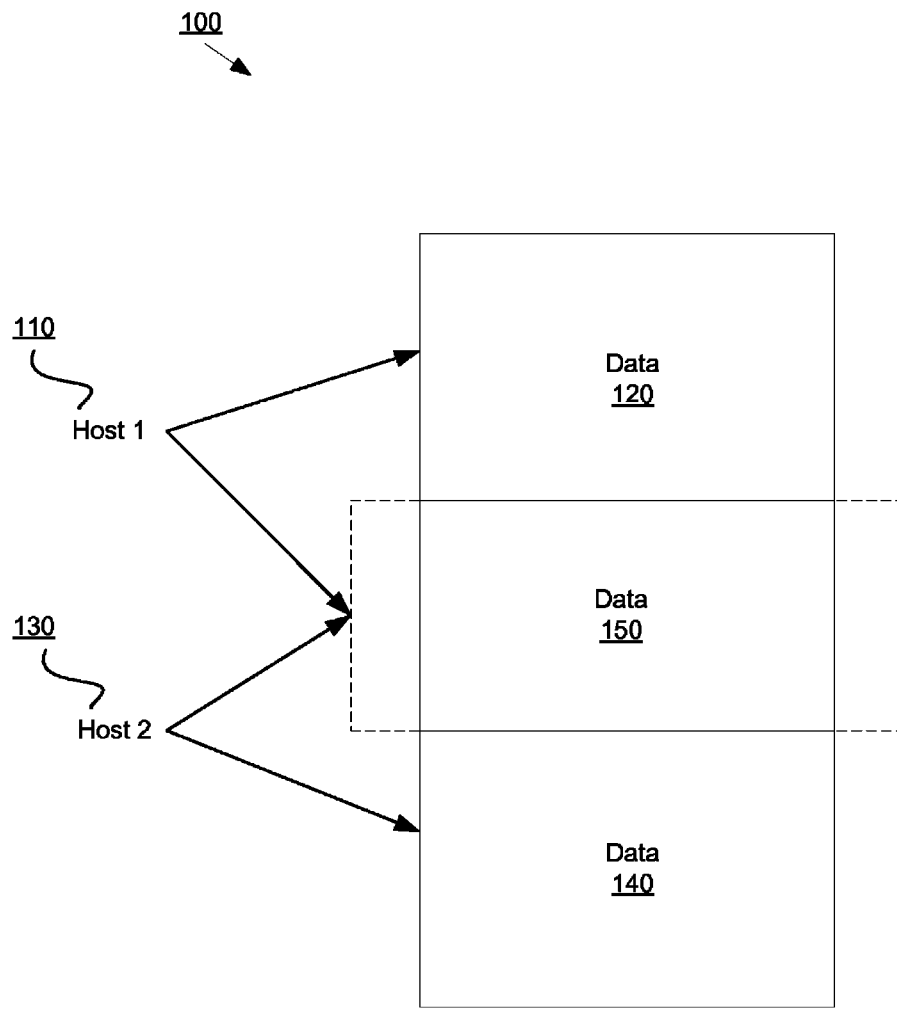
FIG. 1 illustrates an exemplary data sharing implementation according to one embodiment of the present invention.

FIG. 1 shows an exemplary data sharing implementation according to one embodiment of the present invention. Host 110 has access to data 120, which contains host 110's private data. Host 130 has access to data 140, which contains host 130's private data. Host 110 and host 130 share data 150, which contains data accessible to both host 110 and host 130. In one embodiment, data 150 contains executables and libraries that are shared among multiple hosts. By sharing data 150 among multiple hosts, the executables, libraries, and other shared data do not need to be duplicated, thereby allowing for more efficient storage and a reduction in the amount of storage needed by each virtual host, and by the overall storage system.

Figure 2:
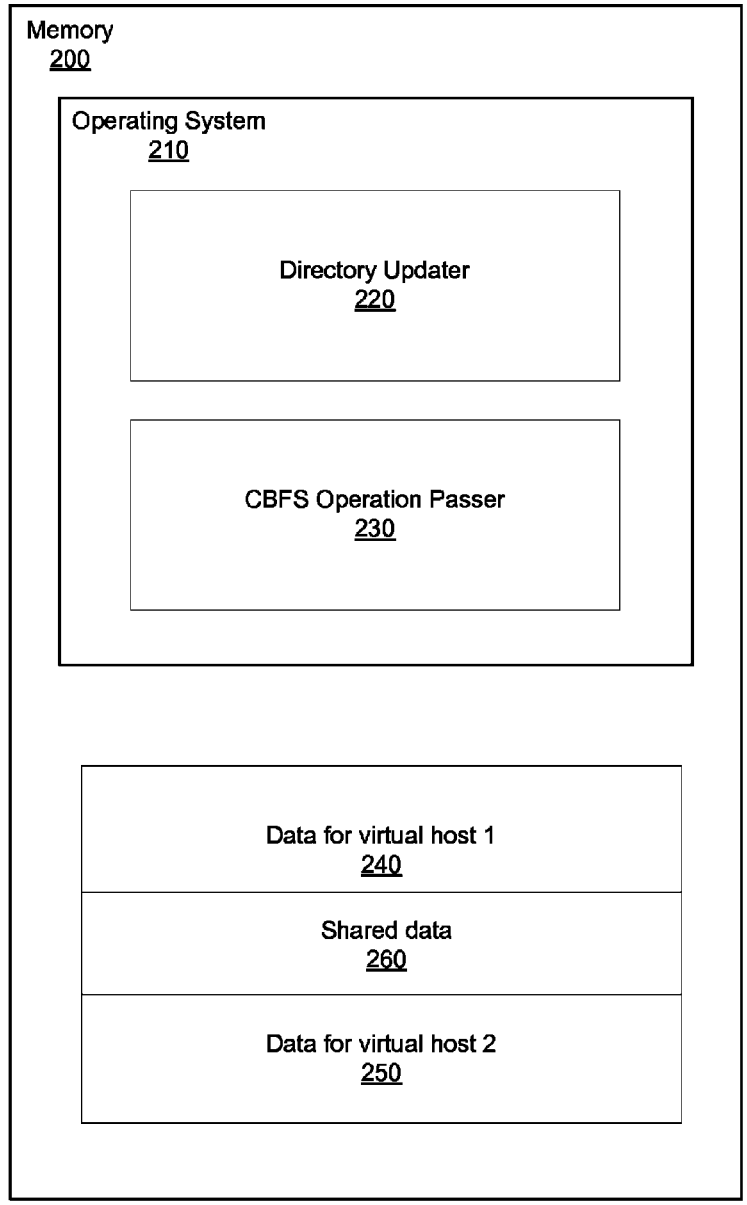
FIG. 2 is a block diagram of an illustrative embodiment of a memory in a network storage system in accordance with embodiments of the present invention.

FIG. 2 is a block diagram of an exemplary memory 200 in accordance with embodiments of the present invention. Memory 200 contains operating system 210, data for virtual host 1 240, data for virtual host 2 250, and shared data 260. Within operating system 210, there is directory updater 220 and CBFS operation passer 230. In other embodiments, the software components 220 and 230 can be separate from and not part of an operating system. Although memory 200 has been shown as a single memory, this is just one illustrative embodiment. In alternate embodiments, memory 200 can be split into more than one memory.

Directory updater 220 and CBFS operation passer 230 are used to implement data sharing by the CBFS. Directory updater 220 changes the root directory of a virtual host. In one embodiment, directory updater 220 changes the root directory of a virtual host to the CBFS's mount point, resulting in all operation requests of the virtual host to be passed to CBFS operation passer 230. In an alternate embodiment, directory updater 200 changes the root directory of a virtual host to a private directory associated with the virtual host. CBFS operation passer 230 passes an operation request to a file system based on the data sharing implementation. For example, if virtual host 1 requests an operation, the operation is passed to a file system containing data for virtual host 1 240, which corresponds to data in virtual host 1's private directory. If virtual host 2 requests an operation, the operation is passed to a file system containing data for virtual host 2 250, which corresponds to data in virtual host 2's private directory. However, if an operation request is requested by a different virtual host running on the system, the operation is passed to a file system containing the portion of shared data 260. Portion of shared data 260 corresponds to the directory in which the request was made because the different virtual host does not have a private directory.

Figure 3:
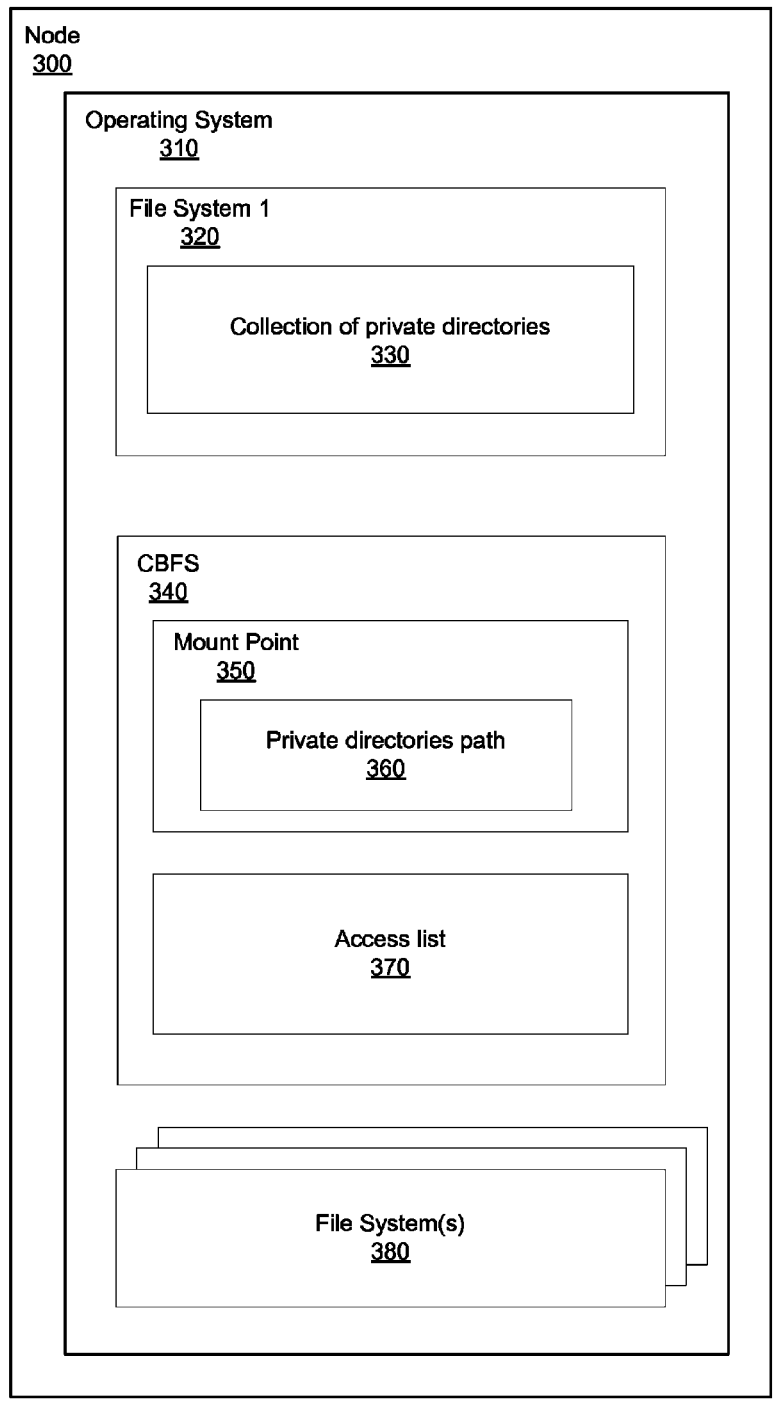
FIG. 3 is a block diagram of an illustrative embodiment of a node including a context-based file system according to one embodiment of the present invention.

FIG. 3 is a block diagram of a node in a network storage system in accordance with embodiments of the present invention. Node 300 contains operating system 310. Operating system 310 contains file system 1 320, CBFS 340, and file system(s) 380. File system 1 320 includes collection of private directories 330. CBFS 340 includes mount point 350 and access list 370. Mount point 350 includes private directories path 360.

A virtual host running on node 300 requests an operation on a file system object. CBFS 330 receives the request from operating system 310. In one embodiment, CBFS 330 reads access list 370. Access list 370 includes one or more file system objects (directories, files, character devices, block devices, named pipes, etc.), which may not be accessed by a virtual host. In this embodiment, based on access list 370, the request is or is not performed.

Private directories of all virtual hosts are stored in a collection of private directories 330 in file system 1 320. File system 1 320 is a file system which is accessible to CBFS 340. In one embodiment, CBFS 340 accesses private directories path 360 in mount point 350 to read the path for the root directory of private directories associated with a virtual host. In this embodiment, CBFS 340 determines if a private directory associated with the virtual host exists by reading private directories path 360. CBFS 340 then determines if a directory exists in collection of private directories 330 which is associated with the virtual host. In this embodiment, if a private directory associated with the identified virtual host exists, CBFS 340 forwards the requested operation to file system 1 320 to perform the requested operation on the private directory. In this embodiment, if a private directory associated with the identified virtual host does not exist, CBFS 340 forwards the request to operating system 310, which determines a file system selected from file system(s) 380 that contains the file system object on which the operation was requested. In an alternate embodiment, CBFS 340 forwards the operation to operating system 310. Operating system 310 forwards the request to a file system selected from file system 1 320 and file system(s) 380 based on the file system object. In one embodiment, CBFS 340 forwards the requested operation to the selected file system with additional information related to the requested operation. In an alternate embodiment, CBFS 340 forwards only the requested operation to the selected file system without any additional information.

Figure 4A:
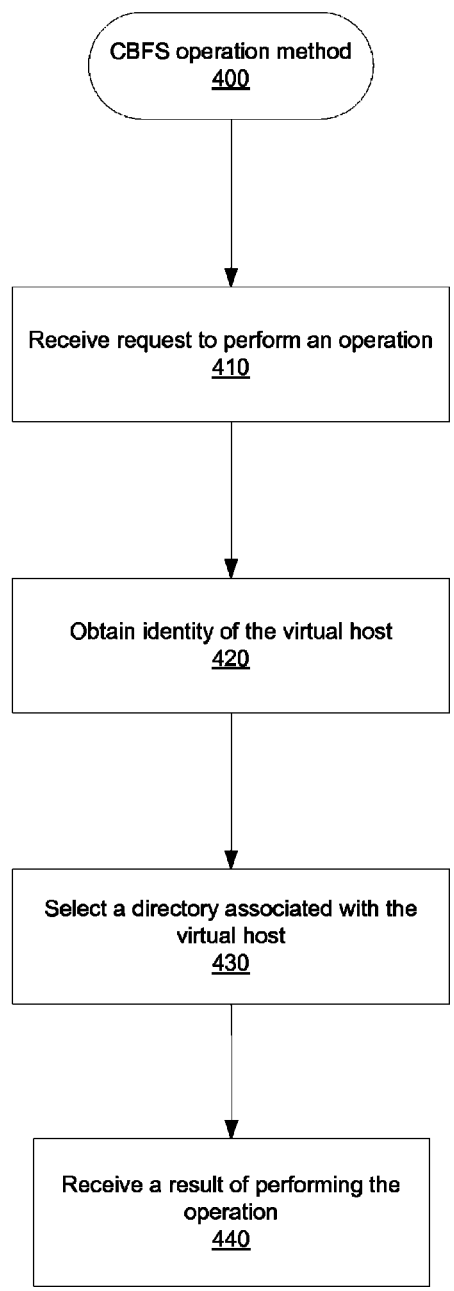
FIG. 4A illustrates a flow diagram of a context-based file system operation method in accordance with embodiments of the present invention.

One embodiment of a CBFS operation method 400 implemented on a clustered file system is described with reference to the flowchart shown in FIG. 4A. Referring to FIG. 4A, the method 400 receives a request to perform an operation at block 410. The request includes a file system object (directories, files, character devices, block devices, named pipes, etc.) on which to perform the operation. A requested operation may include a make directory request, a remove directory request, a remove file request, a create request, a make node request, a link request, a rename request, or any other operation on a file system object supported by the file system. The type of the operation is determined from the requested operation, and therefore may include make directory, remove directory, remove file, create, make node, link, rename, or any other type of operation on a file system object supported by the file system.

At block 420, the method obtains the identity of the virtual host that made the request from the operating system. The identity is obtained by requesting information from the operating system. In one embodiment, the obtained information is the virtual host identifier. In an alternate embodiment, the obtained information is a structure maintained for the virtual host by the operating system. In this embodiment, the CBFS extracts the virtual host identifier from the structure. In one embodiment, the structure is stored in memory. In an alternate embodiment, the structure is stored on a disk. The CBFS can decide which data stored in the structure to use as the virtual host identifier. Optionally, at block 420, the CBFS may read an access list including one or more file system objects (directories, files, character devices, block devices, named pipes, etc.), which may not be accessed by a virtual host. In one embodiment, the access list further includes identifying information for one or more virtual hosts which cannot access the file system objects. In an alternate embodiment, no identifying information for virtual hosts is included in the access list. In this embodiment, all virtual hosts are prohibited from accessing any of the file system objects listed in the access list. If the requested operation is to be performed on a file system object included in access list, the CBFS notifies the virtual host that the operation cannot be performed.

At block 430, the method selects a directory associated with the virtual host. The selection of the directory is made based on the type of the operation and a position of the directory in the hierarchy. The selecting of the directory associated with the virtual host is described below in conjunction with FIGS. 4B, 6, and 7.

Upon selecting a directory associated with the virtual host, method 400 receives a result of performing the operation on the selected directory at block 440. In one embodiment, the result of performing the operation is received as a construct from the file system which performed the operation on the selected directory. In an alternate embodiment, the result of performing the operation is received as data from the operation. In another alternate embodiment, no result of the operation is received as a result of performing the operation. In one embodiment, additional information is added to the received result and the updated result is forwarded from the CBFS to the virtual host. In an alternate embodiment, the received result is forwarded from the CBFS to the virtual host as it was received from the operating system, without any additional information. In another alternate embodiment, the received result is not forwarded from the CBFS to the virtual host.

Figure 4B:
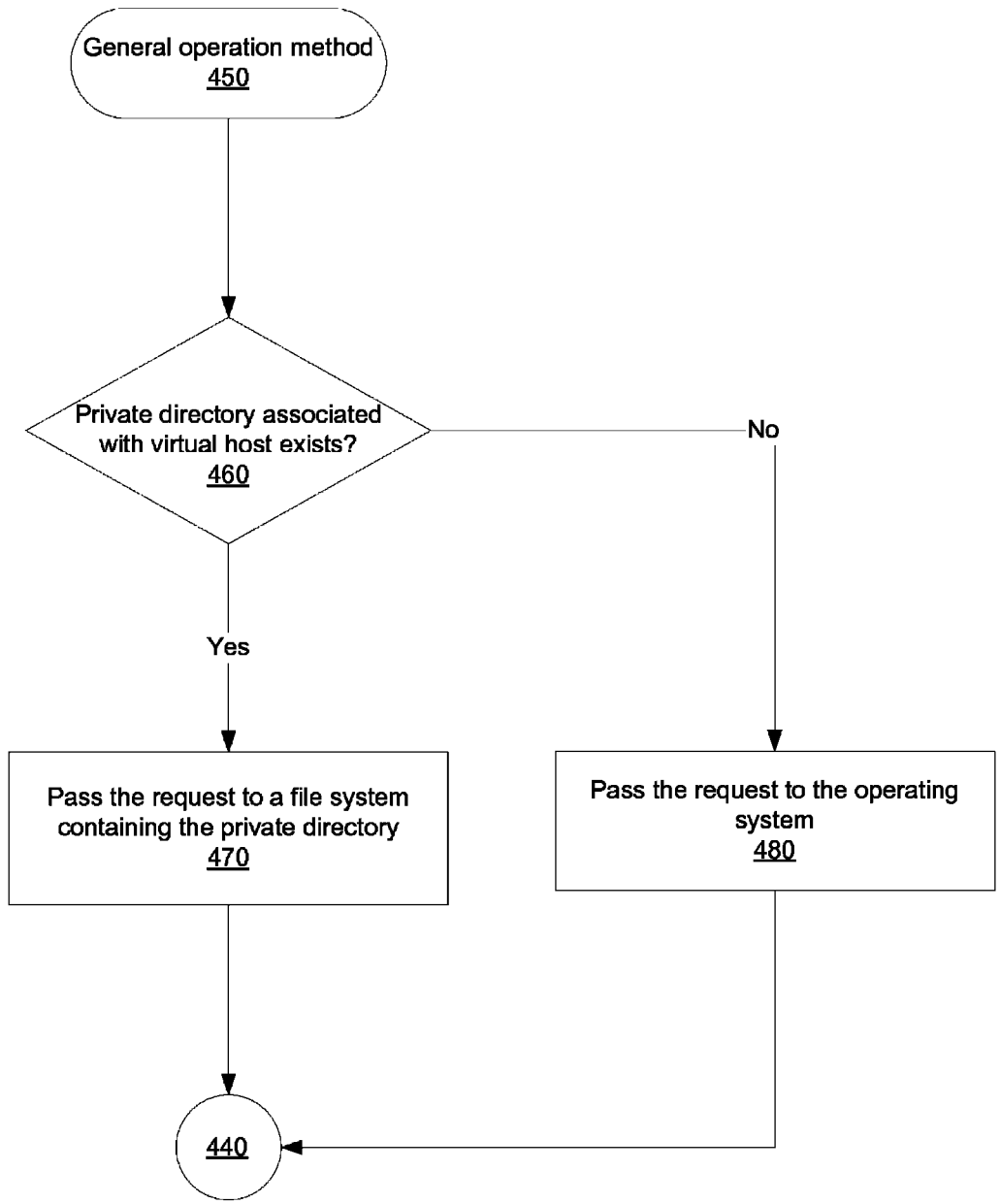
FIG. 4B illustrates a flow diagram of a general operation method in accordance with embodiments of the present invention.

One embodiment of a general operation method 450 to be performed by a CBFS operating on a clustered file system is described with reference to the flowchart shown in FIG. 4B. Referring to FIG. 4B, the method 450 determines if a private directory associated with the virtual host exists at block 460. This determination is made by reading the path of virtual host directories from the mount point of the CBFS. The CBFS sends an operation request to the directory contained in the path to list the entries in the directory. The listed entries are compared to the virtual host identifier. If a listed entry matches the virtual host identifier, then the listed entry is a private directory associated with the virtual host.

If a private directory associated with the virtual host exists, the CBFS passes the request to the file system containing the private directory at block 470. The file system containing the private directory performs the requested operation on the private directory. In one embodiment, the private directory associated with the virtual host includes data which is private to the virtual host and is therefore only accessible to the virtual host. In an alternate embodiment, the private directory associated with the virtual host may be accessible to other virtual hosts to which the virtual host has specifically granted access. The result of the requested operation is returned to the virtual host as described above with reference to block 440 of FIG. 4A.

If a private directory associated with the virtual host does not exist, the CBFS passes the request to the operating system running on the node at block 480. The operating system determines a file system running on the node that contains the directory on which the operation was requested. The operating system determines the directory on which the operation was requested by using the file system object included with the request. The result of the requested operation is returned to the virtual host as described above with reference to block 440 of FIG. 4A.

Figure 5:
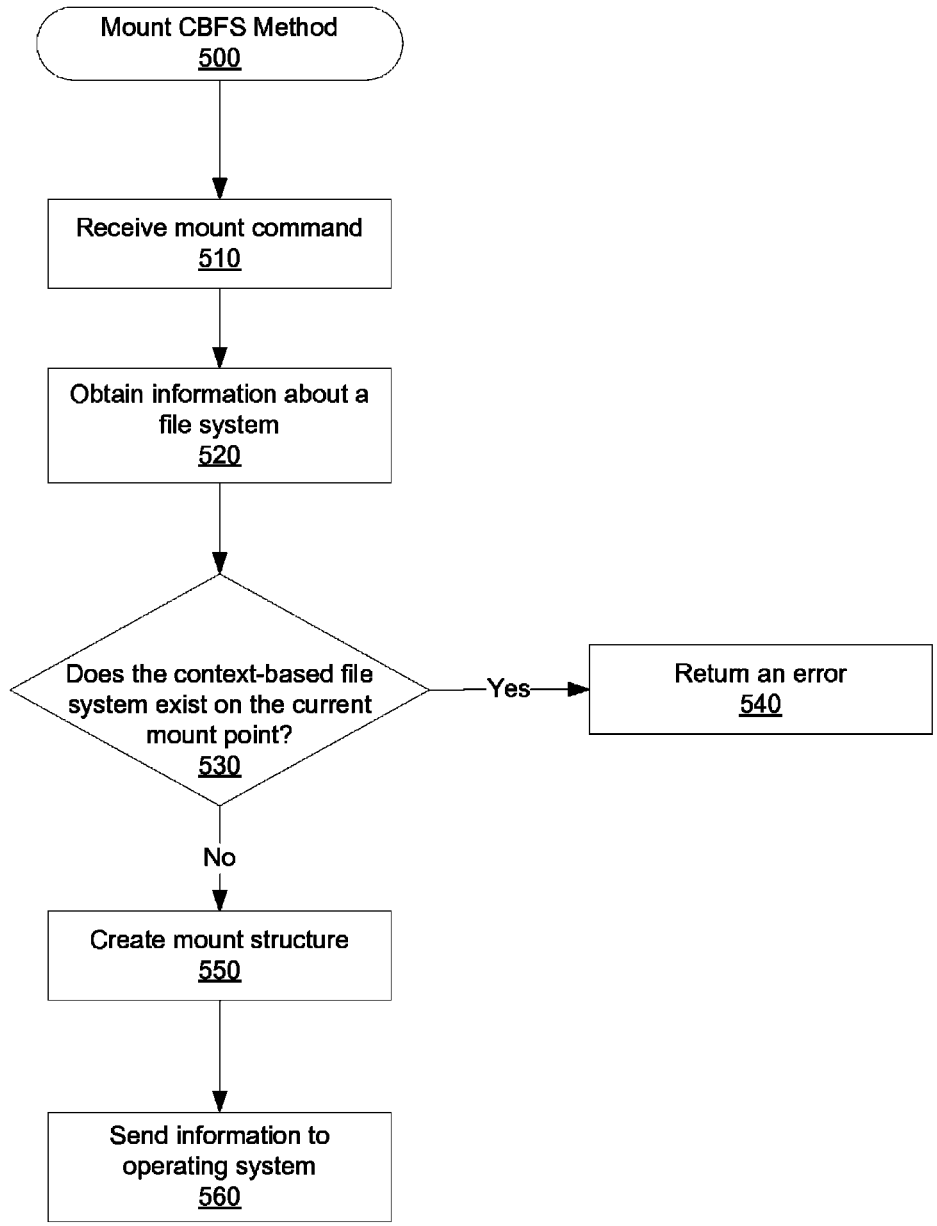
FIG. 5 illustrates a flow diagram of a mount operation method performed in accordance with embodiments of the present invention.

One embodiment of a mount operation method 500 to be performed by a storage server to mount a CBFS on a node is described with reference to the flowchart shown in FIG. 5. Referring to FIG. 5, the method 500 receives a mount command for a CBFS at block 510. In one embodiment, the storage server mounts a CBFS upon booting a node on the storage server. In an alternate embodiment, the storage server mounts a CBFS upon rebooting a node on the storage server. In one embodiment, one or more options are passed with the mount command to the node. The options can include a target path, a relative path, and a list of components. The target path is the path at which to store the per virtual host private directories. The target path is stored in a file system containing the private directories. The relative path includes a path for configuration files and directories which are specific to a virtual host running on the storage server. The list of components can include directories which are not accessible to a virtual host. For example, the list of components may include the target path in order to prevent any virtual host from being able to access the private files of other virtual hosts.

At block 520, method 500 obtains information from the operating system about a file system operating on the node. The file system contains the private directories for the virtual hosts running on the node. In one embodiment, the file system containing the private directories is a local file system. In an alternate embodiment, the file system containing the private directories is a remote file system. In this embodiment, one example of a remote file system is a clustered file system.

At block 530, the method determines if the CBFS exists on the current mount point. The CBFS makes this determination by comparing a list of mount points obtained from the operating system to a pre-determined CBFS identifier. The list of mount points is maintained by the operating system. The operating system creates the list when a first file system is mounted on the system and adds an identifier associated with the first file system to the list. Each time a file system is successfully mounted on the system, the list of mount points is updated to include an identifier associated with the successfully mounted file system. If any of the mount points in the list match the pre-determined CBFS identifier, then a CBFS exists on the mount point and an error is returned for the mount command (block 540).

If the CBFS does not exist on the current mount point, the method creates a mount structure on the node for the CBFS at block 550. The mount structure is used to re-route commands requested by a virtual host to the CBFS. Once the mount structure is created, a reference to the underlying file system is stored in the mount structure of the CBFS. If a relative path was received as an option to the mount command, the relative path is saved in the mount structure of the CBFS. If a list of components was received as an option to the mount command, the list of components is saved in the mount structure of the CBFS. In one embodiment, the list of components is stored as an array of identifiers, where each identifier identifies a separate directory which a virtual host should not have access to. In an alternate embodiment, the list of components is stored. In one embodiment, the number of components in the list is stored in the mount structure of the CBFS. In another embodiment, the number of components in the list is not stored in the mount structure of the CBFS.

At block 560, the CBFS sends the mount structure to the operating system such that the operating system can include the CBFS in a table of mount points maintained by the operating system.

Figure 6:
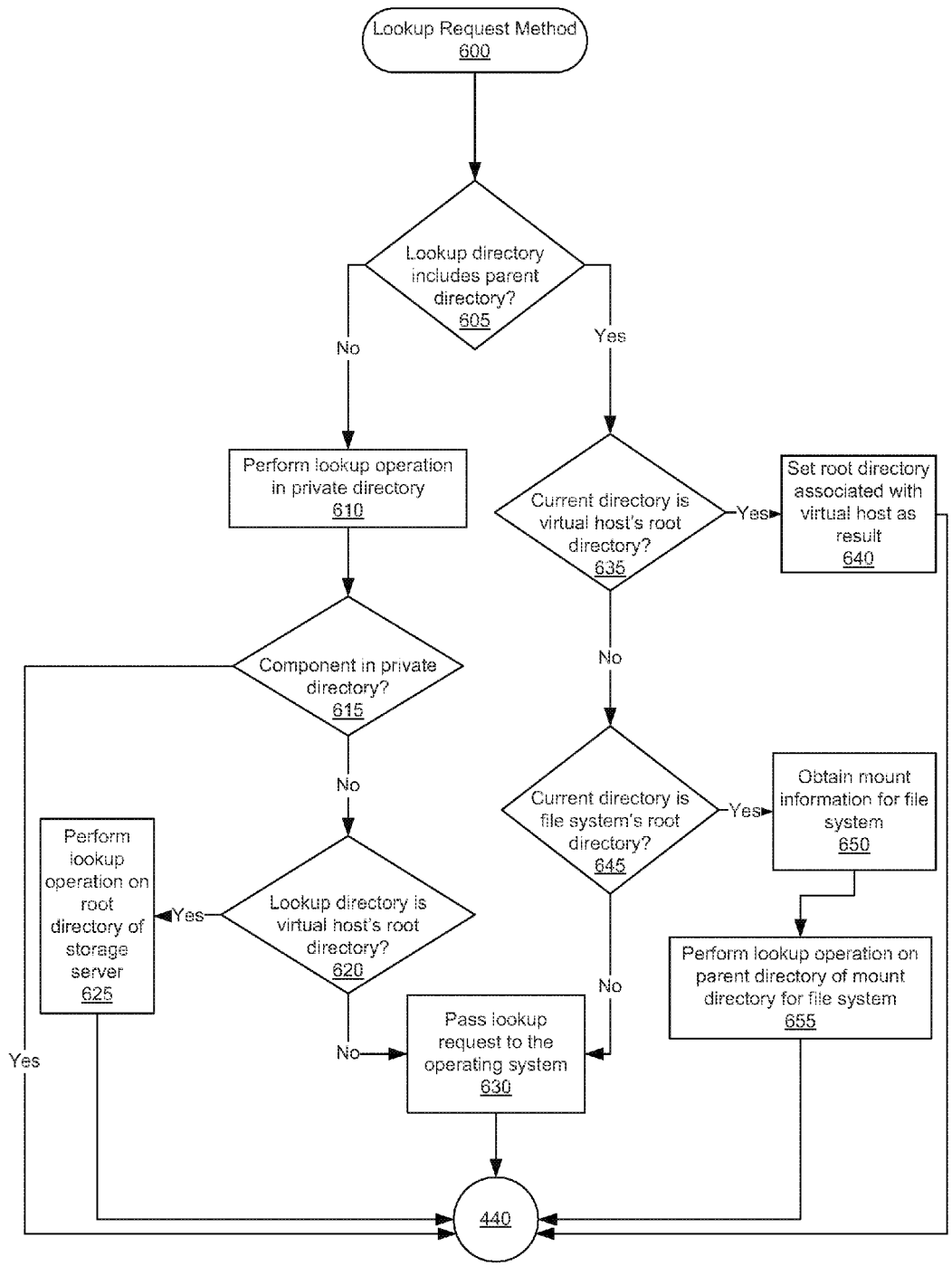
FIG. 6 illustrates a flow diagram of a lookup request method performed on a context-based file system in accordance with embodiments of the present invention.

One embodiment of a lookup request method 600 to be performed by a CBFS operating on a clustered file system is described with reference to the flowchart shown in FIG. 6. In one embodiment, method 600 is performed by CBFS operation passer 230 of FIG. 2.

The type of the operation in method 600 is lookup and a component received with the lookup request may be a file system object, such as a directory, file, character device, block device, named pipe, etc. In one embodiment, a lookup directory in which to perform the lookup request is included with the lookup request and the component. In an alternate embodiment, only the component is included with the lookup request. In this embodiment, the lookup directory is the directory in which the lookup request was performed.

At block 605, the method determines if a lookup directory includes a parent directory. A parent directory is a directory which is located above a child directory in a hierarchical file system. The hierarchical file system has a set of directories with parent-child relationships and a root directory. In one embodiment, a parent directory is represented by "... " at the beginning of the lookup directory included in the lookup request. In an alternate embodiment, a parent directory is represented by a full path of the directory in a hierarchical file system.

If the lookup directory does not include a parent directory, the method performs the lookup operation in a private directory associated with the virtual host at block 610. The lookup operation is performed by forwarding a lookup request to the operating system. The lookup request includes the component and the private directory associated with the virtual host. The result of the lookup for the component on the private directory is obtained from the operating system.

At block 615, the method determines if the component is in the private directory associated with the virtual host based on the result of the lookup obtained from the operating system. If the result of the lookup is successful (returns the component), the result of the lookup request is returned to the virtual host as described above with reference to block 440 of FIG. 4A. If the result of the lookup is unsuccessful (error), the component is determined to not be in the private directory associated with the virtual host and the method determines if the lookup directory is the root directory associated with the virtual host at block 620. The root directory associated with the virtual host is predetermined and is the highest level directory in the hierarchical file system that contains the private directories associated with the virtual host.

If the lookup directory matches the root directory associated with the virtual host, the lookup request is performed on the root directory of the storage server hosting the virtual host at block 625. The root directory of the storage server is the root directory of the node on which the instance of a file system containing the private directory associated with the virtual host is mounted. For example, if the lookup request is received for virtual host 1 for component "user", and the component was not found in "/virtualhost/1/usr", then the lookup request should search "/" for the component. The method performs the lookup request on the root directory of the storage server by forwarding a lookup request to the operating system. The lookup request includes the component and the root directory of the storage server. The result of the lookup request is returned to the virtual host as described above with reference to block 440 of FIG. 4A. If the lookup directory is not the root directory associated with the virtual host at block 620, the lookup request as received from the virtual host is passed to the operating system at block 630. The result of the lookup request is returned to the virtual host as described above with reference to block 440 of FIG. 4A.

If the lookup directory includes a parent directory at block 605, the method determines if the current directory is the root directory associated with the virtual host at block 635. The current directory is an initial directory which is used by the lookup operation request to determine where the lookup should be performed. For example, if a lookup operation request includes the directory ".../bin/foo", and the full path of the directory is "/usr/bin/foo", the current directory is the "/usr/bin/" directory. In another example, if a lookup operation request includes the directory ".../.../foo", and the full path of the directory is "/usr/bin/foo", the current directory is the "/usr/bin" directory. The root directory associated with the virtual host is predetermined and is the highest level directory that contains the private directories associated with the virtual host. If the current directory is the root directory associated with the virtual host, there is no parent directory possible because the root directory is the highest level directory. The root directory associated with the virtual host is set as the result of the operation at block 640 and the root directory is returned to the virtual host as described above with reference to block 440 of FIG. 4A.

If the current directory is not the root directory associated with the virtual host, the method determines if the current directory is the root directory of a file system at block 645. If the current directory is not the root directory of a file system, the lookup request as received from the virtual host is passed to the operating system at block 630. The result of the lookup request is returned to the virtual host as described above with reference to block 440 of FIG. 4A.

If the current directory is the root directory of a file system, the method obtains mount information of the file system at block 650. The mount information is obtained from the operating system and includes information about the mount point of the file system and a directory of the mount point. Once the mount information is obtained, the method performs the lookup request on the parent directory of the mount directory for the file system at block 655. In one embodiment, the lookup request is performed on the parent directory of the mount directory for the file system by changing the working directory to the parent directory of the mount directory and forwarding a lookup request to the operating system for the component from the updated directory. In an alternate embodiment, the lookup request is performed on the parent directory of the mount directory for the file system by forwarding a lookup request to the operating system including the component and the parent directory of the mount directory for the file system. The result of the lookup request is returned to the virtual host as described above with reference to block 440 of FIG. 4A.

Figure 7:
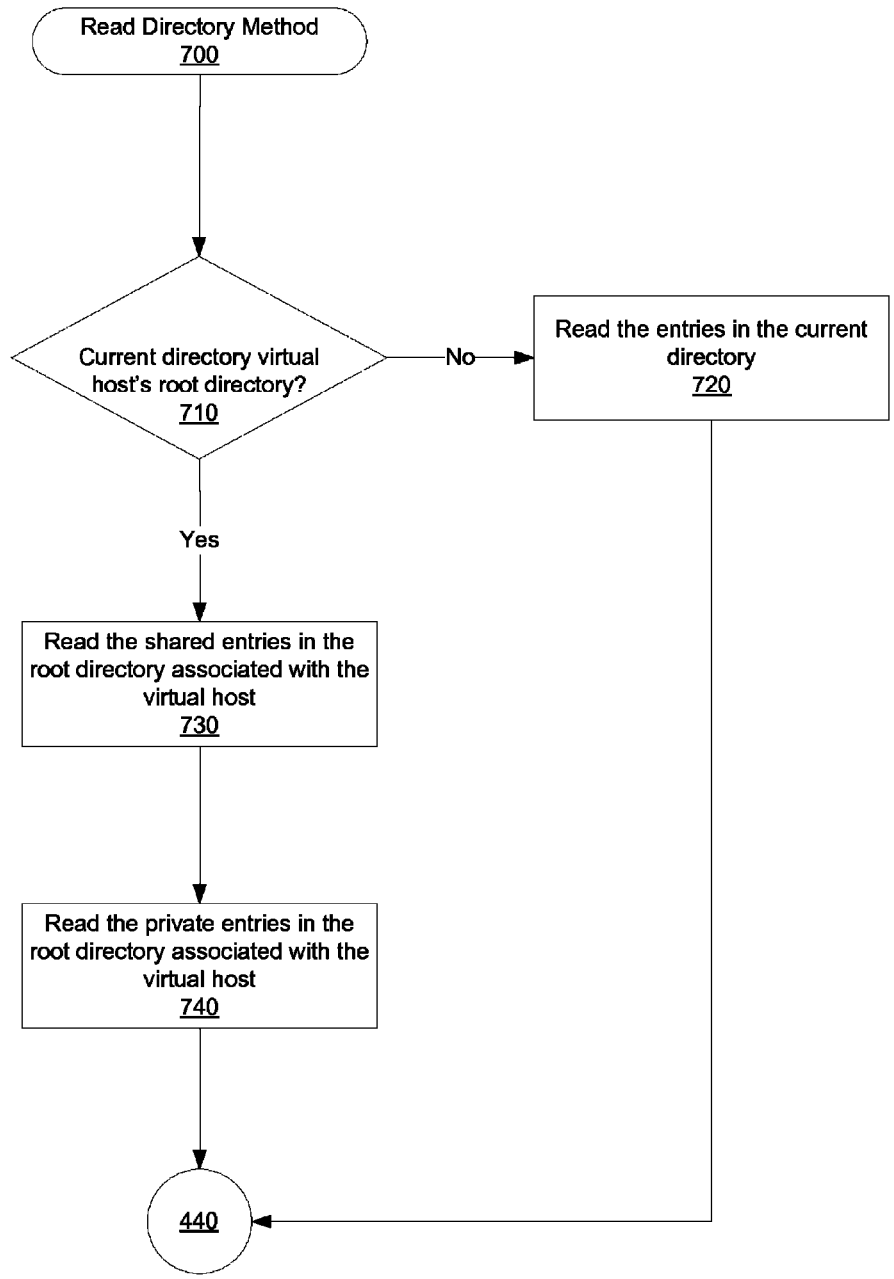
FIG. 7 illustrates a flow diagram of a read directory method performed on a context-based file system in accordance with embodiments of the present invention.

One embodiment of read directory method 700 to be performed by a CBFS implemented on a clustered file system to perform a read directory operation is described with reference to the flowchart shown in FIG. 7. In one embodiment, method 700 is performed by CBFS operation passer 230 of FIG. 2. The type of the operation of method 700 is read directory.

At block 710, the method determines if the current directory is the root directory associated with the virtual host. The current directory is an initial directory which is used by the read directory operation to determine where the read directory operation should be performed. In one embodiment, the read directory operation request includes a current directory. In this embodiment, for example, if a read directory operation request: "readdir /virtualhost/1/usr" was received, the current directory would be "/virtualhost/1/usr". In an alternate embodiment, the read directory operation does not include a current directory. In this embodiment, the current directory is set to the directory in which the read directory operation request was made. In this embodiment, for example, if the read directory operation request: "readdir /virtualhost/2/usr" was received, the current directory would be "/virtualhost/2/usr". The current directory is read and compared to the root directory associated with the virtual host. If there is no match between the current directory and the root directory associated with the virtual host, the method reads the entries in the current directory at block 720.

If the current directory matches the root directory associated with the virtual host, the method reads the shared entries in the root directory associated with the virtual host at block 730. The private entries in the root directory associated with the virtual host are read at block 740.

The result of the read directory operation is returned to the virtual host as described above with reference to block 440 of FIG. 4A. In one embodiment, if the shared entries and the private entries in the root directory associated with the virtual host were read, the results are concatenated prior to being returned. In an alternate embodiment, if the shared entries and the private entries in the root directory associated with the virtual host were read, the results are returned separately. In one embodiment, the results of the read directory are returned by forwarding a construct representing the result from the CBFS to the virtual host. In this embodiment, the CBFS receives the construct from the file system which performed the operation. In an alternate embodiment, the result of the operation returned from the CBFS to the virtual host is the data received from the operation. In another alternate embodiment, no result of the operation is returned once the operation has completed.

Figure 8:
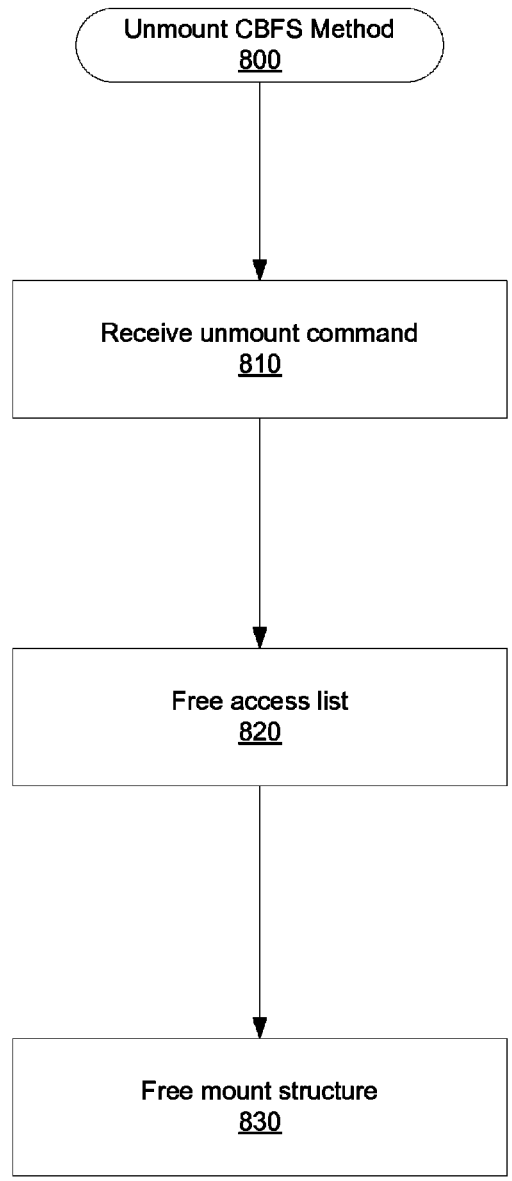
FIG. 8 illustrates a flow diagram of an unmount operation method in accordance with embodiments of the present invention.

One embodiment of an unmount CBFS method 800 to be performed by a storage server to unmount a CBFS on a node is described with reference to the flowchart shown in FIG. 8. Referring to FIG. 8, unmount method 800 receives an unmount command to unmount a CBFS from a node at block 810. In one embodiment, the unmount command is received when a node in a clustered file system is being shut down. In this embodiment, the unmount command is routed from the clustered file system to the CBFS on the node which is being shut down. In an alternate embodiment, the unmount command is received when a virtual host is deleted.

An access list associated with the CBFS, including a list of components that one or more virtual hosts do not have access to in a CBFS, is freed at block 820. The list of components is stored as an array of identifiers, where each identifier identifies a separate directory which a virtual host should not have access to. In one embodiment, the access list is freed by removing it from memory associated with the node from which the CBFS is being unmounted. In an alternate embodiment, the access list is freed by removing a pointer of the access list from memory.

At block 830, the mount structure belonging to a CBFS operating on a node of a clustered file system is freed. In one embodiment, the mount structure is freed by removing it from memory associated with the node from which the CBFS is being unmounted. In an alternate embodiment, the mount structure is freed by removing a pointer of the mount structure from memory.

Figure 9A:
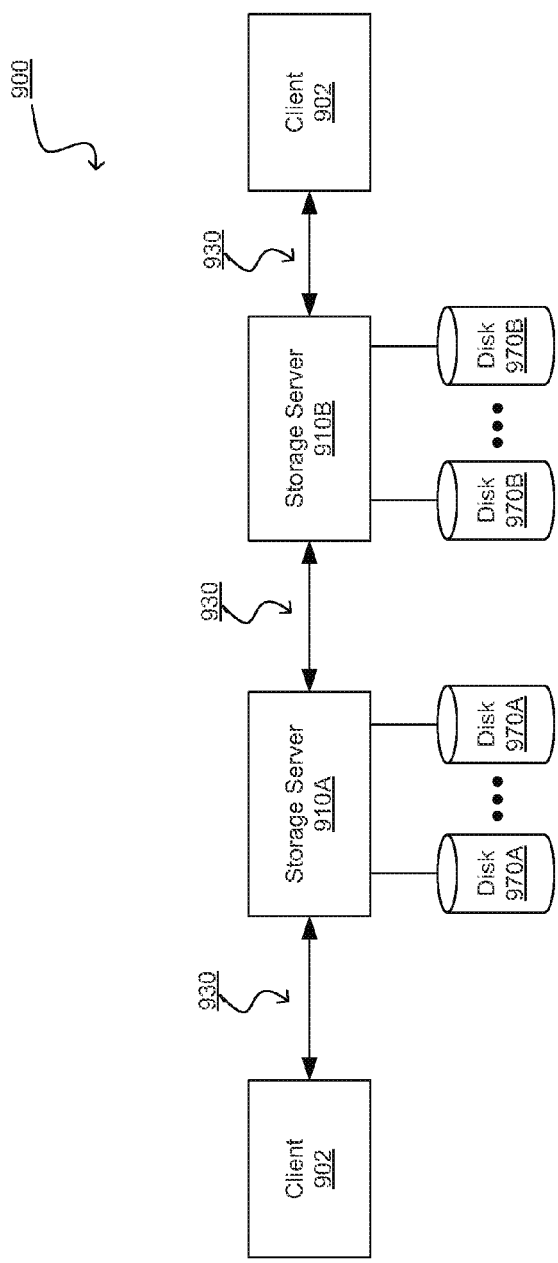
FIG. 9A illustrates a network storage system in which the present invention may be implemented.

FIG. 9A illustrates a network storage system in which the present invention may be implemented. FIG. 9A shows a network storage system 900 in which the present invention can be implemented in one embodiment. Storage servers 910 (storage servers 910A, 910B) each manage multiple storage units 970 that include mass storage devices (not shown). These storage servers provide data storage services to one or more clients 902 through a network 930. Network 130 may be, for example, a local area network (LAN), wide area network (WAN), metropolitan area network (MAN), global area network such as the Internet, a Fibre Channel fabric, or any combination of such interconnects. Each of clients 902 may be, for example, a conventional personal computer (PC), server-class computer, workstation, handheld computing or communication device, or other special or general purpose computer.

Storage of data in storage units 970 is managed by storage servers 910 which receive and respond to various read and write requests from clients 902, directed to data stored in or to be stored in storage units 170. Storage units 970 constitute mass storage devices which can include, for example, flash memory, magnetic or optical disks, or tape drives. The storage devices in storage units 970 can further be organized into arrays (not shown in this figure) implementing a Redundant Array of Inexpensive Disks/Devices (RAID) scheme, whereby storage servers 910 access storage units 970 using one or more RAID protocols known in the art.

Storage servers 910 can provide file-level service such as used in a network-attached storage (NAS) environment, block-level service such as used in a storage area network (SAN) environment, a service which is capable of providing both file-level and block-level service, or any other service capable of providing other data access services. Although storage servers 910 are each illustrated as single units in FIG. 9A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 9B.

In yet other embodiments, storage servers 910 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage server connected to a primary storage server. A network storage subsystem can also be implemented with a collection of networked resources provided across multiple storage servers and/or storage units.

Illustratively, one of the storage servers (e.g., storage server 910A) functions as a primary provider of data storage services to client 902. Data storage requests from client 902 are serviced using disks 970A organized as one or more storage objects. A secondary storage server (e.g., storage server 910B) takes a standby role in a protection relationship with the primary storage server, replicating storage objects from the primary storage server to storage objects organized on disks of the secondary storage server (e.g., disks 970B). In operation, the secondary storage server does not service requests from client 902 until data in the primary storage object becomes inaccessible such as in a disaster with the primary storage server, such event considered a failure at the primary storage server. Upon a failure at the primary storage server, requests from client 902 intended for the primary storage object are serviced using replicated data (i.e. the secondary storage object) at the secondary storage server.

It will be appreciated that in other embodiments, network storage system 900 may include more than two storage servers. In these cases, protection relationships may be operative between various storage servers in system 900 such that one or more primary storage objects from storage server 110A may be replicated to a storage server other than storage server 110B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 110 should be taken as illustrative only.

Figure 9B:
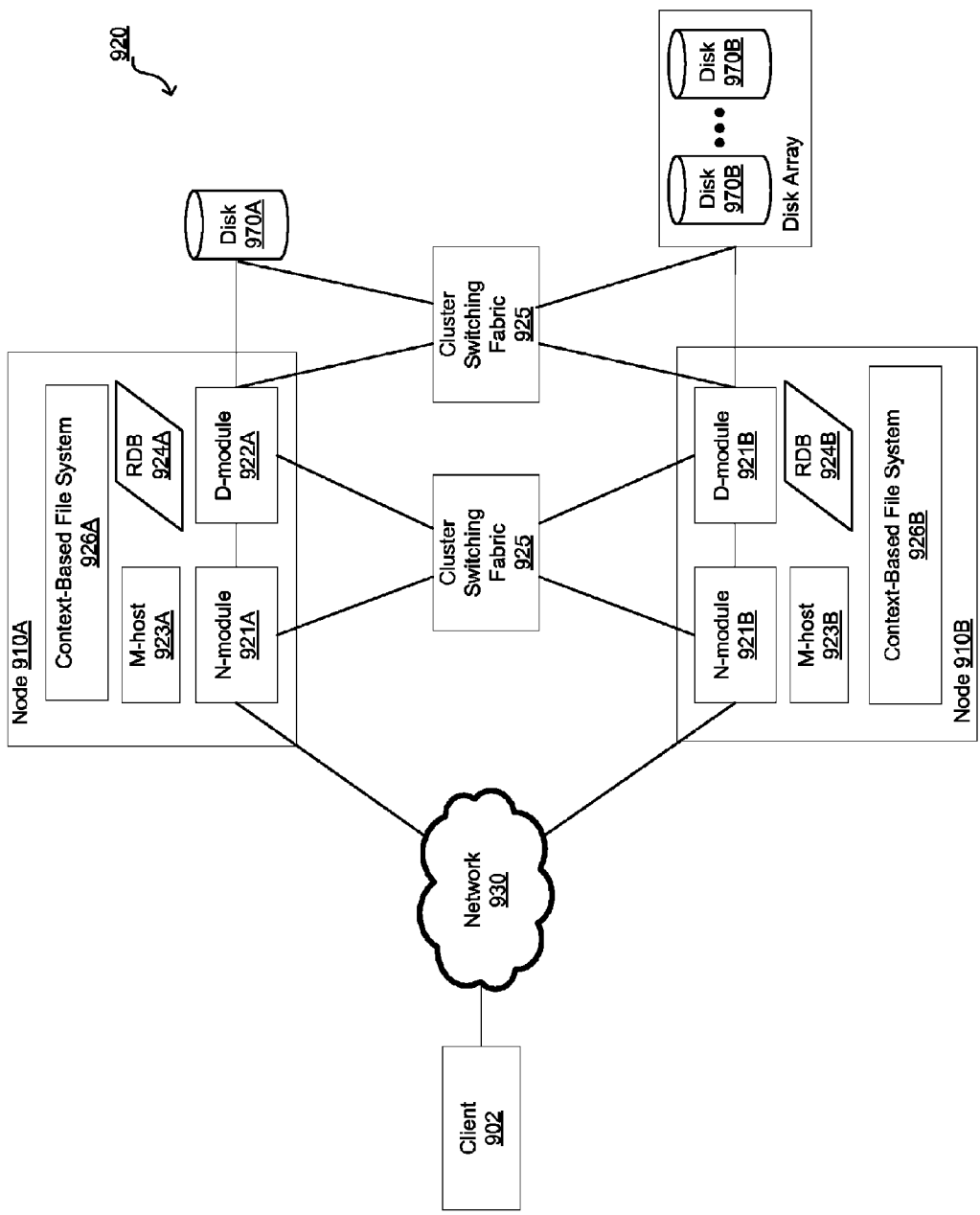
FIG. 9B illustrates a distributed or clustered architecture for a network storage system in which the present invention may be implemented in an alternative embodiment.

FIG. 9B illustrates a distributed or clustered architecture for a network storage system in which the present invention may be implemented in an alternative embodiment.

FIG. 9B illustrates a schematic block diagram of a distributed or clustered network storage system 920 which may implement the principles of the present invention in one embodiment. System 920 may include storage servers implemented as nodes 910 (nodes 910A, 910B) which are each configured to provide access to storage devices 970. In the illustrative example, nodes 910 are interconnected by a cluster switching fabric 925 which may be embodied as an Ethernet switch for instance.

Nodes 910 may be operative as multiple functional components that cooperate to provide a distributed architecture of system 920. To that end, each node 910 may be organized as a network element or module (N-module 921A, 921B), a disk element or module (D-module 922A, 922B), and a management element or module (M-host 923A, 923B). In one embodiment, each module includes a processor and memory for carrying out respective module operations. For example, N-module 921 may include functionality that enables node 910 to connect to client 902 via network 930 and may include protocol components such as a media access layer, Internet Protocol (IP) layer, Transport Control Protocol (TCP) layer, User Datagram Protocol (UDP) layer, and other protocols known in the art.

In contrast, D-module 922 may connect to one or more storage devices 970 via cluster switching fabric 925 and may be operative to service access requests on devices 970. In one embodiment, the D-module 122 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. Illustratively, a storage abstraction layer (e.g., file system) of the D-module divides the physical storage of devices 970 into storage objects. Requests received by node 910 (e.g., via N-module 921) may thus include storage object identifiers to indicate a storage object on which to carry out the request. The requests may be passed to a context-based file system to be performed.

Also operative in node 910 is M-host 923 which provides cluster services for node 910 by performing operations in support of a distributed storage system image, for instance, across system 920. Illustratively, M-host 923 provides cluster services by managing a data structure such as a RDB 924 (RDB 924A, RDB 924B) which contains information used by N-module 921 to determine which D-module 922 "owns" (services) each storage object. The various instances of RDB 924 across respective nodes 910 may be updated regularly by M-host 923 using conventional protocols operative between each of the M-hosts (e.g., across network 930) to bring them into synchronization with each other. A client request received by N-module 921 may then be routed to the appropriate D-module 922 for servicing to provide a distributed storage system image.

Context-based file system 926 operating on node 910 allows multiple virtual hosts running on node 910 to share data which is not private to a specific virtual host, such as executables and libraries. Furthermore, data which is private to a virtual host cannot be accessed by other virtual hosts running on the network storage system.

It should be noted that while FIG. 9B shows an equal number of N- and D-modules constituting a node in the illustrative system, there may be different number of N- and D-modules constituting a node in accordance with various embodiments of the present invention. For example, there may be a number of N-modules and D-modules of node 910A that does not reflect a one-to-one correspondence between the N- and D-modules of node 910B. As such, the description of a node comprising one N-module and one D-module for each node should be taken as illustrative only.

Figure 10:
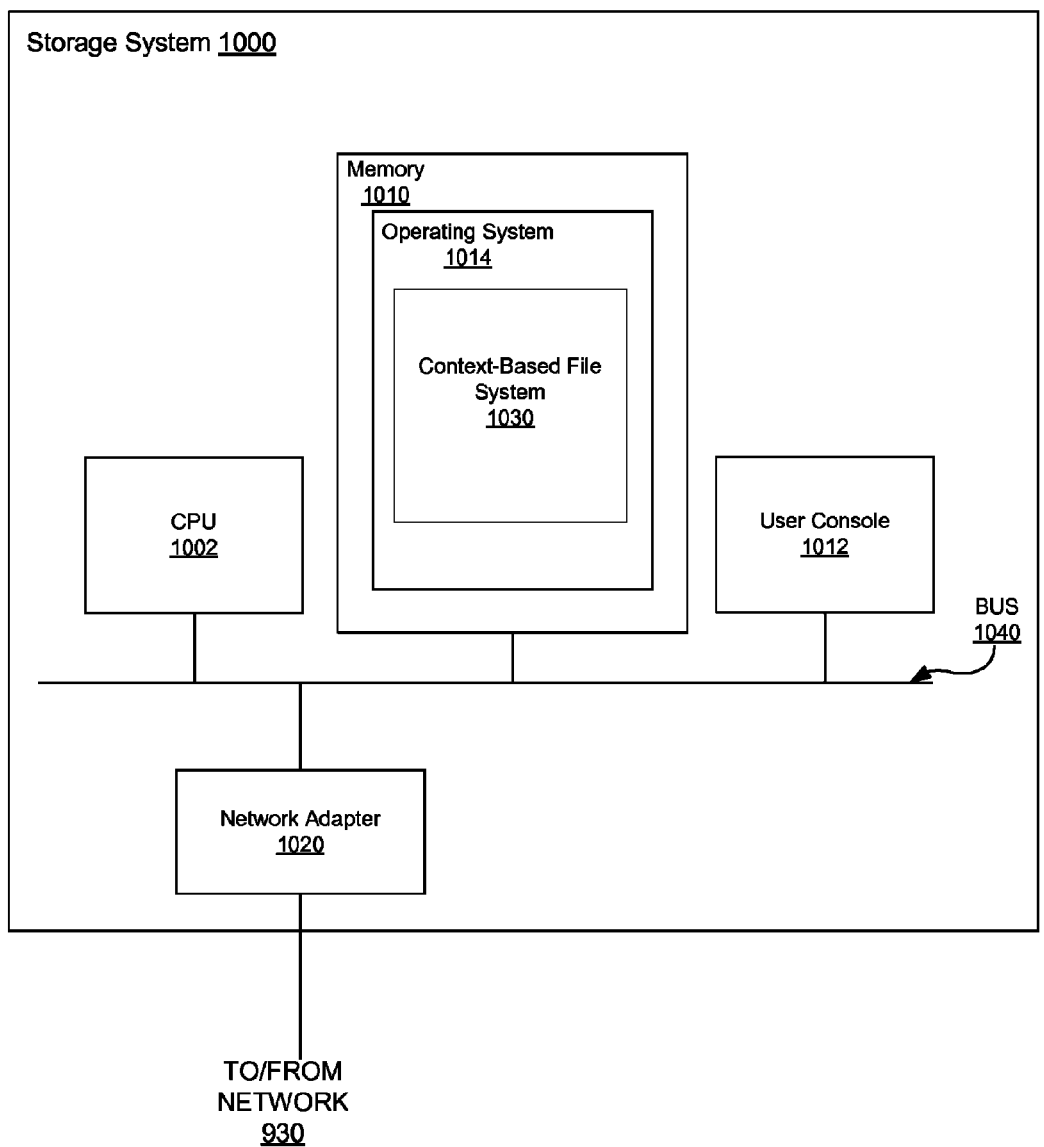
FIG. 10 is a block diagram of an illustrative embodiment of an environment including a cluster-based file system in which the invention may be advantageously implemented.

FIG. 10 is a block diagram of an illustrative embodiment of an environment including a cluster-based file system of FIGS. 2 and 3 in which the invention may be advantageously implemented.

In certain embodiments, CBFS 1030 may be implemented as a user application executed by an operating system of a device in a storage system (e.g., system 900 or system 920) located remotely from a primary storage server (e.g., storage server 910A). For instance, CBFS 1030 may be implemented as a user application operative at a secondary storage server (e.g., storage server 910B). It will be appreciated, however, that functional components of the CBFS may be implemented by hardware, firmware, or software-executing processors in accordance with the teachings of the present invention.

Preferably, system 1000 implementing CBFS 1030 includes a central processing unit (CPU) 1002, a memory 1010, a network adapter 1020, and a user console 1012 interconnected by a system bus 1040. Memory 1010 includes storage locations that are addressable by CPU 1002 and network adapter 1020 for storing processor-executable instructions and data structures associated with the present invention. Network adapter 1020 includes the mechanical, electrical and signaling circuitry needed to connect CBFS 1030 over network 930 from FIGS. 9A and 9B, for instance. CPU 1002 and network adapter 1020 may thus include processing elements and/or logic circuitry configured to execute software code and manipulate data structures for communicating with other computing devices such as storage servers 910 (910A and 910B) of FIGS. 9A and 9B. Operating system 1014, portions of which are typically resident in memory 1010 and executed by CPU 1002, functionally organizes the CBFS.

It will be apparent to those skilled in the art that other processing means may be used for executing instructions and other memory means, including various computer readable media, may be used for storing program instructions pertaining to the inventive techniques described herein. It will also be apparent that some or all of the functionality of the processing element (e.g., CPU 202) and executable software can be implemented by hardware, such as integrated currents configured as programmable logic arrays, ASICs, and the like.

Illustratively, user console 1012 includes, for example, a keyboard and monitor for enabling an administrator to interface with the protection manager. In one embodiment, the administrator interfaces with user console 1012 to request operations and provide input to the CBFS in support of operation and management services provided by the CBFS to storage servers in the system. In other embodiments, the administrator may interface with CBFS 1030 across network 930 using graphical user interfaces, for instance.

The methods as described herein are not described with reference to any particular programming language. It will be appreciated that a variety of programming languages may be used to implement the teachings of the present invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be further appreciated that more or fewer processes may be incorporated into the methods 400, 450, 500, 600, 700, and 800 in FIG. 4A, FIG. 4B, FIG. 5, FIG. 6, FIG. 7, and FIG. 8 respectively without departing from the scope of the invention and that no particular order is implied by the arrangement of blocks shown and described herein.

The foregoing description has been directed to particular embodiments of the disclosure. However, it will be apparent that other variations and modifications may be made to the described embodiments with the attainment of some or all of their advantages. Specifically, it should be noted that the principles of the disclosure may be implemented in a non-distributed file system. Furthermore, while this description has been written in terms of D-blades, N-blades, and M-hosts, the teachings of the present disclosure are equally suitable to systems in which the functionality of the D-blades, N-blades, and M-hosts are implemented in a single system. Alternatively, the functions of the D-blades, N-blades, and M-hosts may be distributed among a number of separate systems, wherein in each system performs one or more functions. Additionally, some of the features of the present disclosure have been described with respect to a cluster, however, it is equally applicable to clusters including a plurality of nodes, which allow for an n-way failover.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a context-based file system (CBFS), a request to perform an operation at a first directory in a hierarchy of directories from a virtual host of a plurality of virtual hosts running on a storage server, the hierarchy having a parent-child relationship and a root directory, wherein the storage server executes an operating system, wherein each of the plurality of virtual hosts executes its own processes, and wherein the hierarchy includes a set of one or more private directories for each of the plurality of virtual hosts and a set of one or more public directories shared by the plurality of virtual hosts;
   obtaining, by the CBFS, an identifier for the virtual host from the operating system;
   selecting a directory from the hierarchy by:
      identifying, using the identifier, the set of private directories for the virtual host,
      determining whether the first directory exists within the set of private directories for the virtual host,
      when the first directory does exist within the set of private directories for the virtual host, selecting the first directory, and
      when the first directory does not exist within the set of private directories for the virtual host, selecting a second directory from the set of public directories; and
   receiving a result of performing the operation on the selected directory.

2. The method of claim 1, further comprising:
   when the first directory exists in the set of private directories for the virtual host, forwarding the request to a file system that manages the set of private directories associated with the virtual host; and
   when the first directory does not exist in the set of private directories for the virtual host, forwarding the request to the operating system executing on the storage server.

3. The method of claim 1, further comprising:
   prior to receiving the operation, changing a root directory of the virtual host to a mount point of the CBFS.

4. The method of claim 1, further comprising:
   receiving, by the CBFS from the virtual host, a second request to perform a read directory operation at a third directory in the hierarchy of directories;
   determining if the third directory is a root directory of the set of private directories associated with the virtual host;
   if the third directory is not the root directory of the set of private directories associated with the virtual host,
      reading one or more private entries in the third directory, and
      returning the one or more private entries; and
   if the third directory is the root directory of the set of private directories associated with the virtual host,
      reading one or more shared entries in the root directory of the set of public directories,
      reading one or more private entries in the root directory of the set of private directories associated with the virtual host, and
      returning the one or more shared entries and the one or more private entries.

5. The method of claim 4, further comprising:
   concatenating the one or more shared entries and the one or more private entries prior to returning the one or more shared entries and the one or more private entries.

6. The method of claim 1, further comprising:
   receiving, by the CBFS from the virtual host, a second request to perform a lookup operation for a component at a lookup directory in the hierarchy of directories;
   determining if the lookup directory includes a parent directory in the hierarchy, the parent directory located above a current directory in the hierarchy of directories, wherein the current directory is an initial directory in the hierarchy used by the lookup operation;
   if the lookup directory does not include a parent directory,
      performing a lookup operation on a private directory of the set of private directories associated with the virtual host, wherein the lookup operation determines if the component exists in the private directory,
      if the lookup operation determines the component is in the private directory, returning a result of the lookup operation, and if the lookup operation determines the component is not in the private directory:
    determining if the lookup directory is the root directory of the set of private directories associated with the virtual host,
    if the lookup directory is the root directory of the set of private directories associated with the virtual host, performing a lookup operation on a root directory of the storage server, and
    if the lookup directory is not the root directory of the set of private directories associated with the virtual host, forwarding the lookup operation request to the operating system; and
if the lookup directory does include a parent directory,
    determining if the current directory is the root directory of the set of private directories associated with the virtual host,
    if the current directory is the root directory of the set of private directories associated with the virtual host, performing the lookup operation for the component at the root directory of the set of private directories associated with the virtual host and returning the result of the lookup operation, and
    if the current directory is not the root directory of the set of private directories associated with the virtual host,
        determining whether the current directory is a root directory associated with a file system, wherein the root directory associated with the file system exists in the hierarchy,
        if the current directory is not the root directory associated with the file system, forwarding the lookup request to the operating system, and
        if the current directory is the root directory associated with the file system,
            obtaining mount information for the file system that includes a mount point directory, and
            performing a lookup operation on a parent directory of the mount point directory.

7. A computer-readable storage medium comprising executable instructions to cause a processor to perform operations, the operations comprising:
receiving, by a context-based file system (CBFS) a request to perform an operation at a first directory in a hierarchy of directories from a virtual host of a plurality of virtual hosts running on a storage server, the hierarchy having a parent-child relationship and a root directory, wherein the storage server executes an operating system, wherein each of the plurality of virtual hosts executes its own processes, and wherein the hierarchy includes a set of one or more private directories for each of the plurality of virtual hosts and a set of one or more public directories shared by the plurality of virtual hosts;
obtaining, by the CBFS, an identifier for the virtual host from the operating system;
selecting a directory from the hierarchy by:
    identifying, using the identifier, the set of private directories for the virtual host,
    determining whether the first directory exists within the set of private directories for the virtual host,
    when the first directory does exist within the set of private directories for the virtual host, selecting the first directory, and
    when the first directory does not exist within the set of private directories for the virtual host, selecting a second directory from the set of public directories; and
receiving a result of performing the operation on the selected directory.

8. The computer-readable storage medium of claim 7, wherein the operations further comprise:
when the first directory exists in the set of private directories for the virtual host, forwarding the request to a file system that manages the set of private directories associated with the virtual host; and
when the first directory does not exist in the set of private directories for the virtual host, forwarding the request to the operating system executing on the storage server.

9. The computer-readable storage medium of claim 7, wherein the operations further comprise:
prior to receiving the operation, changing a root directory of the virtual host to a mount point of the CBFS.

10. The computer-readable storage medium of claim 7, wherein the operations further comprise:
receiving, by the CBFS from the virtual host, a second request to perform a read directory operation at a third directory in the hierarchy of directories;
determining if the third directory is a root directory of the set of private directories associated with the virtual host;
if the third directory is not the root directory of the set of private directories associated with the virtual host,
    reading one or more private entries in the third directory, and
    returning the one or more private entries; and
if the third directory is the root directory of the set of private directories associated with the virtual host,
    reading one or more shared entries in the root directory of the set of public directories,
    reading one or more private entries in the root directory of the set of private directories associated with the virtual host, and
    returning the one or more shared entries and the one or more private entries.

11. The computer-readable storage medium of claim 10, wherein the operations further comprise:
concatenating the one or more shared entries and the one or more private entries prior to returning the one or more shared entries and the one or more private entries.

12. The computer-readable storage medium of claim 7, wherein the operations further comprise:
receiving, by the CBFS from the virtual host, a second request to perform a lookup operation for a component at a lookup directory in the hierarchy of directories;
determining if the lookup directory includes a parent directory in the hierarchy, the parent directory located above a current directory in the hierarchy of directories, wherein the current directory is an initial directory in the hierarchy used by the lookup operation;
if the lookup directory does not include a parent directory,
    performing a lookup operation on a private directory of the set of private directories associated with the virtual host, wherein the lookup operation determines if the component exists in the private directory,
    if the lookup operation determines the component is in the private directory, returning a result of the lookup operation, and
    if the lookup operation determines the component is not in the private directory:
        determining if the lookup directory is the root directory of the set of private directories associated with the virtual host,
        if the lookup directory is the root directory of the set of private directories associated with the virtual host, performing a lookup operation on a root directory of the storage server, and
if the lookup directory is not the root directory of the set of private directories associated with the virtual host, forwarding the lookup operation request to the operating system; and
if the lookup directory does include a parent directory,
determining if the current directory is the root directory of the set of private directories associated with the virtual host,
if the current directory is the root directory of the set of private directories associated with the virtual host, performing the lookup operation for the component at the root directory of the set of private directories associated with the virtual host and returning the result of the lookup operation, and
if the current directory is not the root directory of the set of private directories associated with the virtual host,
determining whether the current directory is a root directory associated with a file system, wherein the root directory associated with the file system exists in the hierarchy,
if the current directory is not the root directory associated with the file system, forwarding the lookup request to the operating system, and
if the current directory is the root directory associated with the file system,
obtaining mount information for the file system that includes a mount point directory, and
performing a lookup operation on a parent directory of the mount point directory.

13. An apparatus comprising:
a processor;
a context-based file system (CBFS) module executed by the processor and configured to:
receive a request to perform an operation at a first directory in a hierarchy of directories from a virtual host of a plurality of virtual hosts running on a storage server, the hierarchy having a parent-child relationship and a root directory, wherein the storage server executes an operating system, wherein each of the plurality of virtual hosts executes its own processes, and wherein the hierarchy includes a set of one or more private directories for each of the plurality of virtual hosts and a set of one or more public directories to be shared by the plurality of virtual hosts;
obtain an identifier for the virtual host from the operating system;
select a directory from the hierarchy by:
identifying, using the identifier, the set of private directories for the virtual host,
determining whether the first directory exists within the set of private directories for the virtual host,
when the first directory does exist within the set of private directories for the virtual host, selecting the first directory, and
when the first directory does not exist within the set of private directories for the virtual host, selecting a second directory from the set of public directories; and
receive a result of performing the operation on the selected directory.

14. The apparatus of claim 13, wherein the CBFS module is further configured to:
when the first directory exists in the set of private directories for the virtual host, forward the request to a file system that manages the set of private directories associated with the virtual host; and
when the first directory does not exist in the set of private directories for the virtual host, forward the request to the operating system executing on the storage server.

15. The apparatus of claim 13, wherein the CBFS module is further configured to:
prior to receiving the operation, change a root directory of the virtual host to a mount point of the CBFS.

16. The apparatus of claim 13, wherein the CBFS module is further configured to:
receive, from the virtual host, a second request to perform a read directory operation at a third directory in the hierarchy of directories;
determine if the third directory is a root directory of the set of private directories associated with the virtual host;
if the third directory is not the root directory of the set of private directories associated with the virtual host,
read one or more private entries in the third directory, and
return the one or more private entries; and
if the third directory is the root directory of the set of private directories associated with the virtual host,
read one or more shared entries in the root directory of the set of public directories,
read one or more private entries in the root directory of the set of private directories associated with the virtual host, and
return the one or more shared entries and the one or more private entries.

17. The apparatus of claim 16, wherein the CBFS module is further configured to:
concatenate the one or more shared entries and the one or more private entries prior to returning the one or more shared entries and the one or more private entries.

18. The apparatus of claim 13, wherein the CBFS module is further configured to:
receive, from the virtual host, a second request to perform a lookup operation for a component at a lookup directory in the hierarchy of directories;
determine if the lookup directory includes a parent directory in the hierarchy, the parent directory located above a current directory in the hierarchy of directories, wherein the current directory is an initial directory in the hierarchy used by the lookup operation;
if the lookup directory does not include a parent directory,
perform a lookup operation on a private directory of the set of private directories associated with the virtual host, wherein the lookup operation determines if the component exists in the private directory,
if the lookup operation determines the component is in the private directory, return a result of the lookup operation, and
if the lookup operation determines the component is not in the private directory:
determine if the lookup directory is the root directory of the set of private directories associated with the virtual host,
if the lookup directory is the root directory of the set of private directories associated with the virtual host, perform a lookup operation on a root directory of the storage server, and
if the lookup directory is not the root directory associated with the virtual host, forward the lookup operation request to the operating system; and if the lookup directory does include a parent directory,
determine if the current directory is the root directory of the set of private directories associated with the virtual host,
if the current directory is the root directory of the set of private directories associated with the virtual host, perform the lookup operation for the component at the root directory of the set of private directories associated with the virtual host and return the result of the lookup operation, and
if the current directory is not the root directory of the set of private directories associated with the virtual host,
determine whether the current directory is a root directory associated with a file system, wherein the root directory associated with the file system exists in the hierarchy,
if the current directory is not the root directory associated with the file system, forward the lookup request to the operating system, and
if the current directory is the root directory associated with the file system,
obtain mount information for the file system that includes a mount point directory, and
perform a lookup operation on a parent directory of the mount point directory.

19. A storage server comprising:
a processor unit; and
a memory, coupled to the processor unit, storing instructions which, when executed by the processor unit, cause the storage server to implement a context-based file system (CBFS), wherein the CBFS is configured to:
receive a request to perform an operation at a first directory in a hierarchy of directories from a virtual host of a plurality of virtual hosts running on the storage server, the hierarchy having a parent-child relationship and a root directory, wherein the storage server executes an operating system, wherein each of the plurality of virtual hosts executes its own processes, and wherein the hierarchy includes a set of one or more private directories for each of the plurality of virtual hosts and a set of one or more public directories to be shared by the plurality of virtual hosts;
obtain an identifier for the virtual host from the operating system;
select a directory from the hierarchy by:
identifying, using the identifier, the set of private directories for the virtual host,
determining whether the first directory exists within the set of private directories for the virtual host,
when the first directory does exist within the set of private directories for the virtual host, selecting the first directory, and
when the first directory does not exist within the set of private directories for the virtual host, selecting a second directory from the set of public directories; and
receive a result of performing the operation on the selected directory.

20. The storage server of claim 19, wherein the CBFS is further configured to:
when the first directory exists in the set of private directories for the virtual host, forward the request to a file system that manages the set of private directories associated with the virtual host; and
when the first directory does not exist in the set of private directories for the virtual host, forward the request to the operating system executing on the storage server.

21. The storage server of claim 19, wherein the CBFS is further configured to: prior to receiving the operation, change a root directory of the virtual host to a mount point of the CBFS.

22. The storage server of claim 19, wherein the CBFS is further configured to:
receive, from the virtual host, a second request to perform a read directory operation at a third directory in the hierarchy of directories;
determine if the third directory is a root directory of the set of private directories associated with the virtual host;
if the third directory is not the root directory of the set of private directories associated with the virtual host,
read one or more private entries in the third directory, and
return the one or more private entries; and
if the third directory is the root directory of the set of private directories associated with the virtual host,
read one or more shared entries in the root directory of the set of public directories,
read one or more private entries in the root directory of the set of private directories associated with the virtual host, and
return the one or more shared entries and the one or more private entries.

23. The storage server of claim 22, wherein the CBFS is further configured to:
concatenate the one or more shared entries and the one or more private entries prior to returning the one or more shared entries and the one or more private entries.

24. The storage server of claim 19, wherein the CBFS is further configured to:
receive, from the virtual host, a second request to perform a lookup operation for a component at a lookup directory in the hierarchy of directories;
determine if the lookup directory includes a parent directory in the hierarchy, the parent directory located above a current directory in the hierarchy of directories, wherein the current directory is an initial directory in the hierarchy used by the lookup operation;
if the lookup directory does not include a parent directory,
perform a lookup operation on a private directory of the set of private directories associated with the virtual host, wherein the lookup operation determines if the component exists in the private directory,
if the lookup operation determines the component is in the private directory, return a result of the lookup operation, and
if the lookup operation determines the component is not in the private directory:
determine if the lookup directory is the root directory of the set of private directories associated with the virtual host,
if the lookup directory is the root directory of the set of private directories associated with the virtual host, perform a lookup operation on a root directory of the storage server, and
if the lookup directory is not the root directory of the set of private directories associated with the virtual host, forward the lookup operation request to the operating system; and
if the lookup directory does include a parent directory,
determine if the current directory is the root directory of the set of private directories associated with the virtual host,
if the current directory is the root directory of the set of private directories associated with the virtual host, perform the lookup operation for the component at the root directory of the set of private directories associated with the virtual host and return the result of the lookup operation, and if the current directory is not the root directory of the set of private directories associated with the virtual host,
determine whether the current directory is a root directory associated with a file system, wherein the root directory associated with the file system exists in the hierarchy,
if the current directory is not the root directory associated with the file system, forward the lookup request to the operating system, and
if the current directory is the root directory associated with the file system,
obtain mount information for the file system that includes a mount point directory, and
perform a lookup operation on a parent directory of the mount point directory.

25. A method in a computing device for implementing a context-based file system (CBFS) for use by a plurality of virtual hosts, the method comprising:
receiving, by an operating system of the computing device, a request to perform an operation on a file system object from a virtual host of the plurality of virtual hosts;
determining, by the CBFS, whether a private directory associated with the virtual host exists within a collection of private directories in a first file system;
when the private directory associated with the virtual host does exist within the collection of private directories, forwarding the request to the first file system; and
when the private directory associated with the virtual host does not exist within the collection of private directories, determining which file system of a plurality of file systems of the computing device contains the file system object, and
forwarding the request to the determined file system.

26. The method of claim 25, further comprising:
determining, by the CBFS, the identity of the virtual host by receiving a virtual host identifier of the virtual host from the operating system.

27. The method of claim 26, wherein said determining whether the private directory associated with the virtual host exists comprises:
sending, by the CBFS, an operation request to the first file system to list the entries in a directory associated with a mount point of the CBFS;
receiving the list of entries;
determining whether any entry of the list of entries matches the virtual host identifier.

28. The method of claim 25, wherein the private directory is accessible by the virtual host and is not accessible by any other virtual host of the plurality of virtual hosts.

29. The method of claim 25, wherein the first file system is a clustered file system.

30. The method of claim 25, further comprising receiving a result from an execution of the operation from either the first file system or the determined file system.

31. The method of claim 30, further comprising forwarding, by the CBFS, the result to the virtual host.

32. The method of claim 25, further comprising reading, by the CBFS, an access list to determine whether the request to perform the operation on the file system object received from the virtual host is allowed to be performed, wherein the access list comprises a set of one or more file system objects defined as not being available to be accessed by any of the plurality of virtual hosts.

* * * * *